(12) United States Patent
Kurtzberg et al.

(10) Patent No.: US 6,462,759 B1
(45) Date of Patent: Oct. 8, 2002

(54) ADAPTIVE COMPUTER DISPLAY SCREEN WINDOW

(75) Inventors: Jerome M. Kurtzberg; Menachem Levanoni, both of Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/257,427

(22) Filed: Feb. 25, 1999

(51) Int. Cl.$^7$ .................................................. G09G 5/00
(52) U.S. Cl. .................... 345/803; 345/788; 345/789
(58) Field of Search .................. 345/326, 333, 345/342, 334, 700, 712, 744, 745, 747, 783, 806, 811, 764, 781, 864, 762, 767, 788, 782, 803

(56) References Cited

U.S. PATENT DOCUMENTS

| | | | | |
|---|---|---|---|---|
| 5,195,178 A | * | 3/1993 | Krieger et al. | 345/809 |
| 5,241,624 A | * | 8/1993 | Torres | 345/790 |
| 5,495,567 A | * | 2/1996 | Iizawa et al. | 345/334 |
| 5,497,454 A | * | 3/1996 | Bates et al. | 395/344 |
| 5,513,342 A | * | 4/1996 | Leong et al. | 345/798 |
| 5,600,776 A | * | 2/1997 | Johnson et al. | 345/733 |
| 5,669,006 A | * | 9/1997 | Joskowicz et al. | 707/517 |
| 5,682,490 A | * | 10/1997 | Sumino et al. | 345/352 |
| 5,682,538 A | * | 10/1997 | Lemire et al. | 707/507 |
| 5,694,561 A | * | 12/1997 | Malamud et al. | 345/805 |
| 6,014,638 A | * | 1/2000 | Burge et al. | 705/27 |
| 6,026,417 A | * | 2/2000 | Ross et al. | 707/517 |
| 6,043,817 A | * | 3/2000 | Bolnick et al. | 345/342 |
| 6,081,750 A | * | 6/2000 | Hoffberg et al. | 700/17 |

* cited by examiner

*Primary Examiner*—Raymond J. Bayerl
*Assistant Examiner*—Tadesse Hailu
(74) *Attorney, Agent, or Firm*—Stephen C. Kaufman; McGinn & Gibb, PLLC (57) ABSTRACT

The invention monitors user edit actions to window properties, as the edit actions develop over some time period of a first computer operating session. The invention then creates a user profile reflecting such editing actions, for instantiation of an instant window in a second operating session, the instant window responding to and reflecting the user edit actions developed or prompted over the first operating session.

14 Claims, 9 Drawing Sheets

ADAPTIVE COMPUTER DISPLAY SCREEN WINDOW

FIELD OF THE INVENTION

This invention relates to a computer system and method for providing an adaptive computer display screen window.

INTRODUCTION TO THE INVENTION

A typical operation of a computer may include the following sequence of events.

The computer display screen presents to a user, upon the advent of a first operating session, a default display screen window. Thereafter, and within the first operating session, the user may generally edit the default window, by at will e.g., enlarging or shrinking the window, dividing the screen into a plurality of independent windows, or changing at least one of color, font, or topological arrangement of the window (s) per screen.

As this editing action unfolds over time, instantaneous edits generally vitiate previous edit actions. Accordingly, at the conclusion of the first operating session, the original default display screen window has been superseded by an image that represents a users last edit action re enlargement, shrinkage, color, font, etc. This last image, in turn, may or may not (depending on a particular computer system), be invoked at the beginning of a second operating session, in favor of the default display screen window.

SUMMARY OF THE INVENTION

Our work seeks to further improve and refine this illustrative operation of a computer, by enabling it to efficiently and advantageously realize a new capability vis-a-vis the invocation of a computer display screen upon instantiation of an operating session.

In particular, our new capability may be realized in an invention, which in a first aspect, discloses a computer operated method comprising the steps of:
  (i) ascertaining a property of a window to be displayed on a computer screen in a default condition during a first operating session;
  (ii) monitoring property changes prompted by inputs by a user to effect changes to the default condition of the window, thereby reflecting a user's specific window activity pattern developed over the first operating session;
  (iii) creating a referent comprising a history of the step (ii) window activity pattern; and
  (iv) using the referent for generating an instant window for display during a second operating session, which instant window has been adaptively modified from the default condition window so that it's properties correlate to the user's specific window activity pattern developed over the first operating session.

The present invention, accordingly, if now set in apposition to the prior art described above, can be shown to manifest significant differences. It is recalled that as editing actions unfold over time in the prior art, instantaneous edits generally vitiate previous edit actions. The present invention, in sharp contrast, monitors such edit actions (i.e., does not vitiate the edit, as information) to an end of creating a user profile reflecting user editing action developed over at least a finite portion of an operating session. In this way, a display can be presented during a second operating session, which display is cognizant and reflective of user specific window subjectivity, as developed or weighted over time.

Preferably, step (i) of the method includes ascertaining a status of the default condition by registering at least one of font, color, location, shape, and content of the default window.

Step (iii) of the method may include creating the referent by (1) determining frequency-of-use of user window activity; or, (2) computing the maximum likelihood expected values for the properties of user window activity; or, (3) using the last image pattern displayed by the user in that operating session.

Preferably, step (iii) includes creating a referent comprising a user window activity history developed over several operating sessions.

In a second aspect, the present invention discloses a program storage device readable by machine, tangibly embodying a program of instructions executable by the machine to perform method steps for providing an adaptive window display, the method comprising the steps of:
  (i) ascertaining a property of a window to be displayed on a computer screen in a default condition during a first operating session;
  (ii) monitoring property changes prompted by inputs by a user to effect changes to the default condition of the window, thereby reflecting a user's specific window activity pattern developed over the first operating session;
  (iii) creating a referent comprising a history of the step (ii) window activity pattern; and
  (iv) using the referent for generating an instant window for display during a second operating session, which instant window has been adaptively modified from the default condition window so that it's properties correlate to the user's specific window activity pattern developed over the first operating session.

In a third aspect, the present invention discloses a computer system suitable for providing an adaptive computer screen window display, the system comprising:
  (i) CPU means for ascertaining a property of a window to be displayed on a computer screen in a default condition during a first operating session;
  (ii) CPU means for monitoring property changes prompted by inputs by a user to effect changes to the default condition of the window, thereby reflecting a user's specific window activity pattern developed over the first operating session;
  (iii) CPU means for creating a referent comprising a history of the window activity pattern; and
  (iv) CPU means for using the referent for generating an instant window for display during a second operating session, which instant window has been adaptively modified from the default condition window so that it's properties correlate to the user's specific window activity pattern developed over the first operating session.

In a fourth aspect, the present invention discloses a computer system comprising:
  (i) an open loop structure comprising:
    a) a default screen node;
    b) a summing node;
    c) a first input vector derived from the default screen node for input to the summing node and comprising a computer display default screen from a preceding operating session;
    d) a second input vector to the summing node comprising a user generated display screen for input to the summing node during a current operating session; the summing node capable of receiving said first and second input vectors and outputting a first signal; and e) a display processing module which receives the first signal and outputs a resultant display screen; and (ii) a closed loop structure comprising a feedback loop which closes around the open loop structure by:
a) sensing changes in a current display;
b) remembering a history of resultant changes developed over a current operating session; and
c) generating a display screen which is correlated to the history of changes developed over the current operating session, for outputting to the default screen node a new default screen for presentation upon instantiation of a subsequent operating session.

BRIEF DESCRIPTION OF THE DRAWING

The invention is illustrated in the accompanying drawing, in which:

FIGS. 5a and b show a feedback control system that heuristically represents one way of conceptualizing the prior art, while

DETAILED DESCRIPTION OF THE INVENTION

The invention is summarized above, and discloses a novel structure/interface for the management of information stored in computers.

Figure 1:
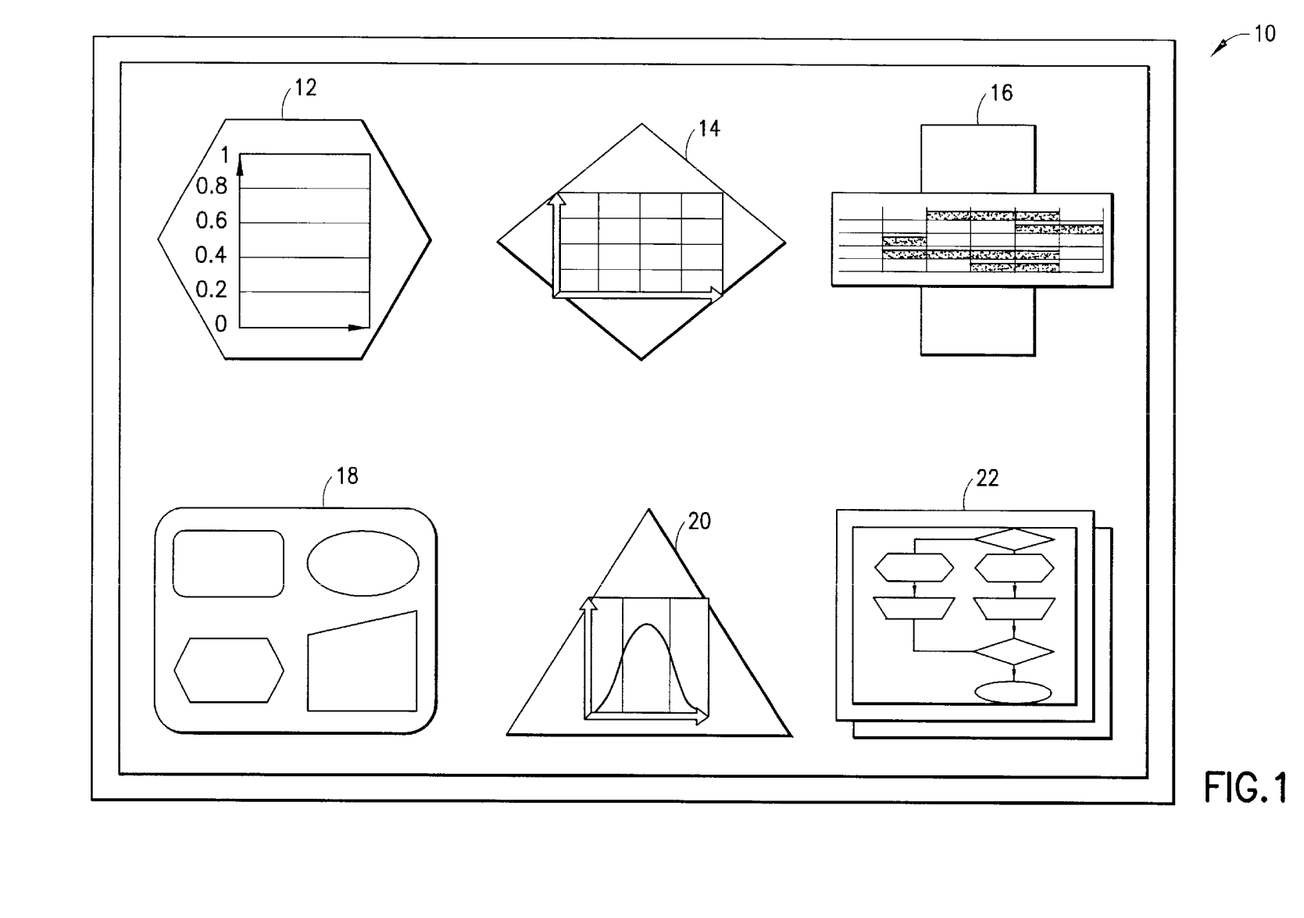
FIG. 1 shows a computer display screen window that represents a default condition for presentation during a first operating session.

In particular, FIG. 1, (numerals 10–22), shows a computer display screen window that represents a default for presentation during a first operating session. In the FIG. 1 default screen 10, the window pattern is selected based on a typical user in that particular area (business, industry, etc.).

FIG. 1 consists of several columns of related subwindows (12–22). These windows capture all that the vast majority of a set of users require to perform a daily routine. A menu bar (not shown), may provide the user with additional capabilities to create/delete windows, import/export data, view data, save information to files or print them, save/retrieve previous layouts, execute commands automatically at prescribed times, display information in several formats, enable/disable specific actions, or access data generated by other users. On-line help may also be provided.

The user is now free to add, delete, or modify the FIG. 1 default pattern, as shown progressively in FIGS. 2a–d, numerals 24–114. Note here, in sharp contrast to the prior art, the present invention monitors the progression of such user modified changes to the FIG. 1 default window, and keeps track of user activity and the resulting window pattern developed over the first operating session, in order to create a referent history.

Figure 2A:
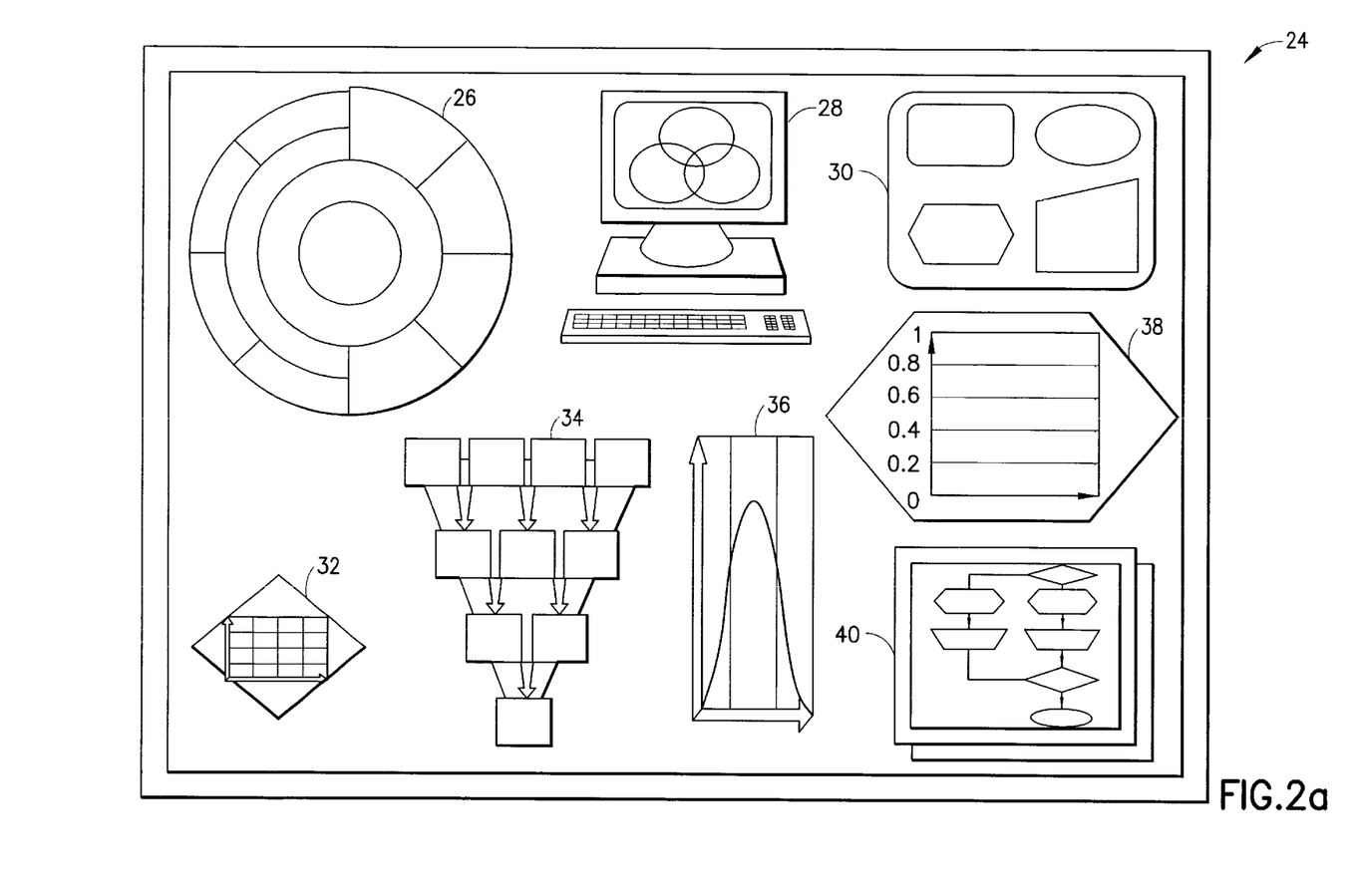
FIGS. 2a–e show a progression of user modified changes to the FIG. 1 default screen window, thereby effecting changes to the default condition of the window as developed over a first operating session.
Figure 2B:
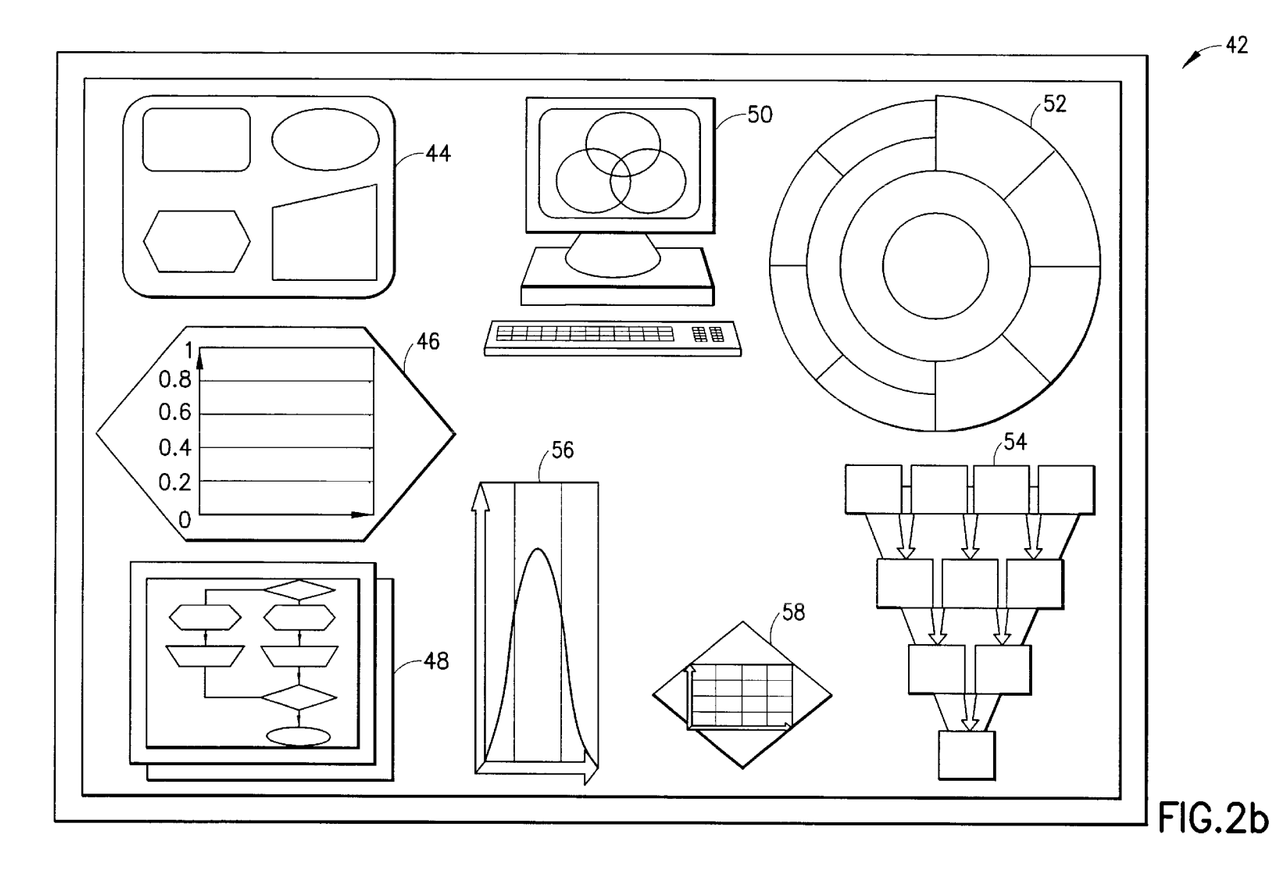

The monitoring action just alluded to includes providing a capability for demarcating a transition from a particular set of user changes, or shown say, in FIG. 2a, to a next set of user changes, say, those in FIG. 2b.

User activity can be tracked via several techniques, which may be based on time, changes in window properties (attributes) or other. For example, on going from FIG. 2c to FIG. 2d, the user may modify the size of the "gaussian" window and move the "table" above the resized gaussian. The computer here "remembers" two layouts: one in which the gaussian has been resized, and one in which the table has moved above the resized gaussian. The signal to "remember" a change in a particular window occurs when a user removes the "focus" from the current window AND the new focus is not that window (thus two consecutive actions on same window are taken as a unit and result in a final window being remembered). In another way, the computer can "wait" a prescribed amount of time before "remembering" a screen layout. This means that if the current screen has not changed (within given tolerances) during a prescribed length of time, a signal is generated to "remember" the screen.

We now turn our attention to the contents and their meanings unfolded over FIGS. 2a–d.

FIG. 2a shows a first user modified screen layout, the FIG. 2a layout preserving some of the FIG. 1 default screen windows, while adding some new windows e.g., a circular icon (26), deleting some old windows (16), and re-arranging the FIG. 1 topology.

Fig. 2b, in turn, shows a second user modified screen layout. Here, in particular, it may be discerned that the FIG. 2a right hand column windows have been transposed by the user, to the left side of the screen, while the circular window icon has been transposed to the right hand column.

Figure 2C:
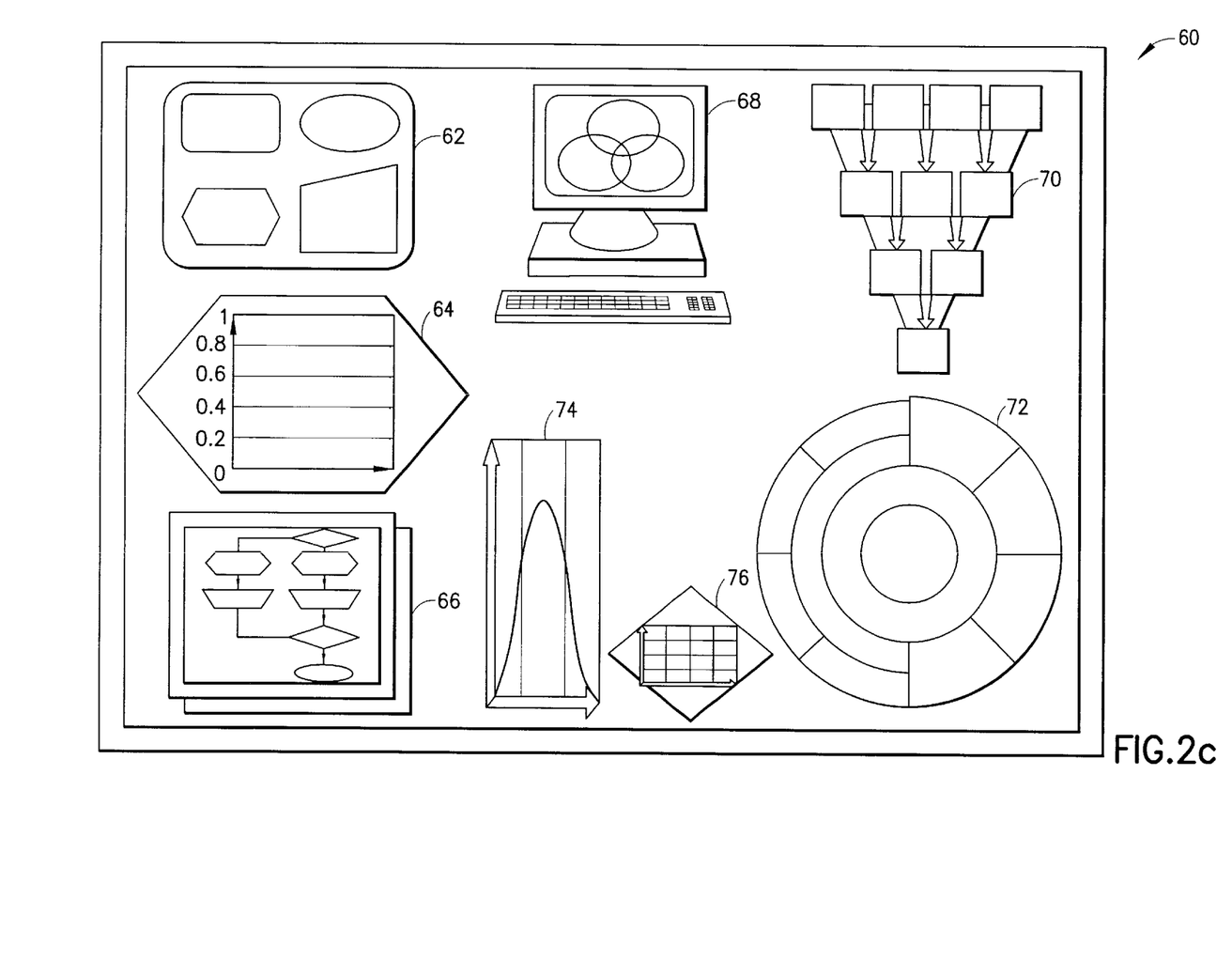

FIG. 2c, in turn, shows a third user modified screen layout. Here, the user generally preserves the general FIG. 2b topology, but does invert the right hand column circular icon/pyramid icon relationship.

Figure 2D:
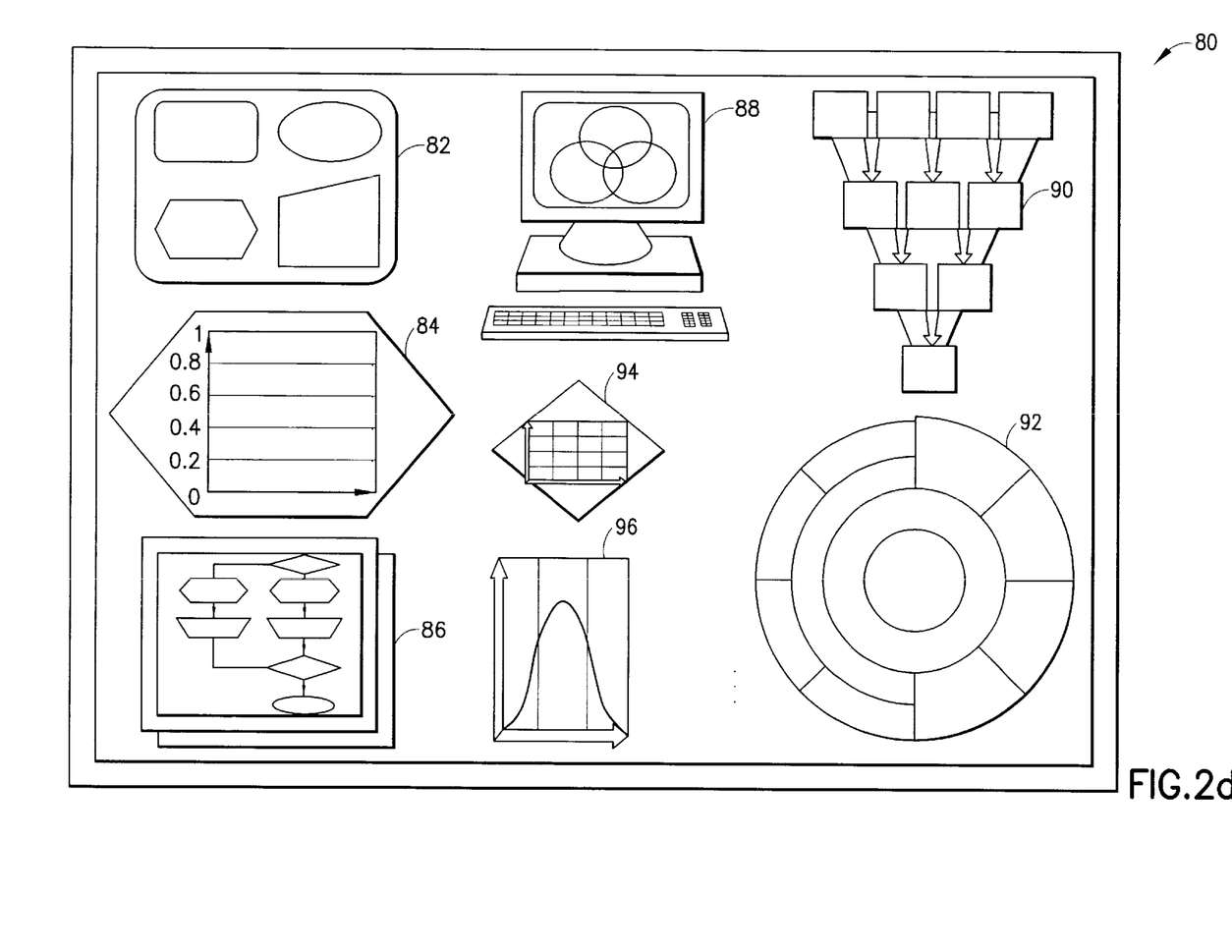

FIG. 2d shows a fourth user modified screen layout. Here, the user preserves invariant most of the FIG. 2c changes, but changes the topological arrangement of the middle column Gaussian curve—Cartesian grid duple, so that they are spaced one on top of the other, instead of side to side.

Figure 2E:
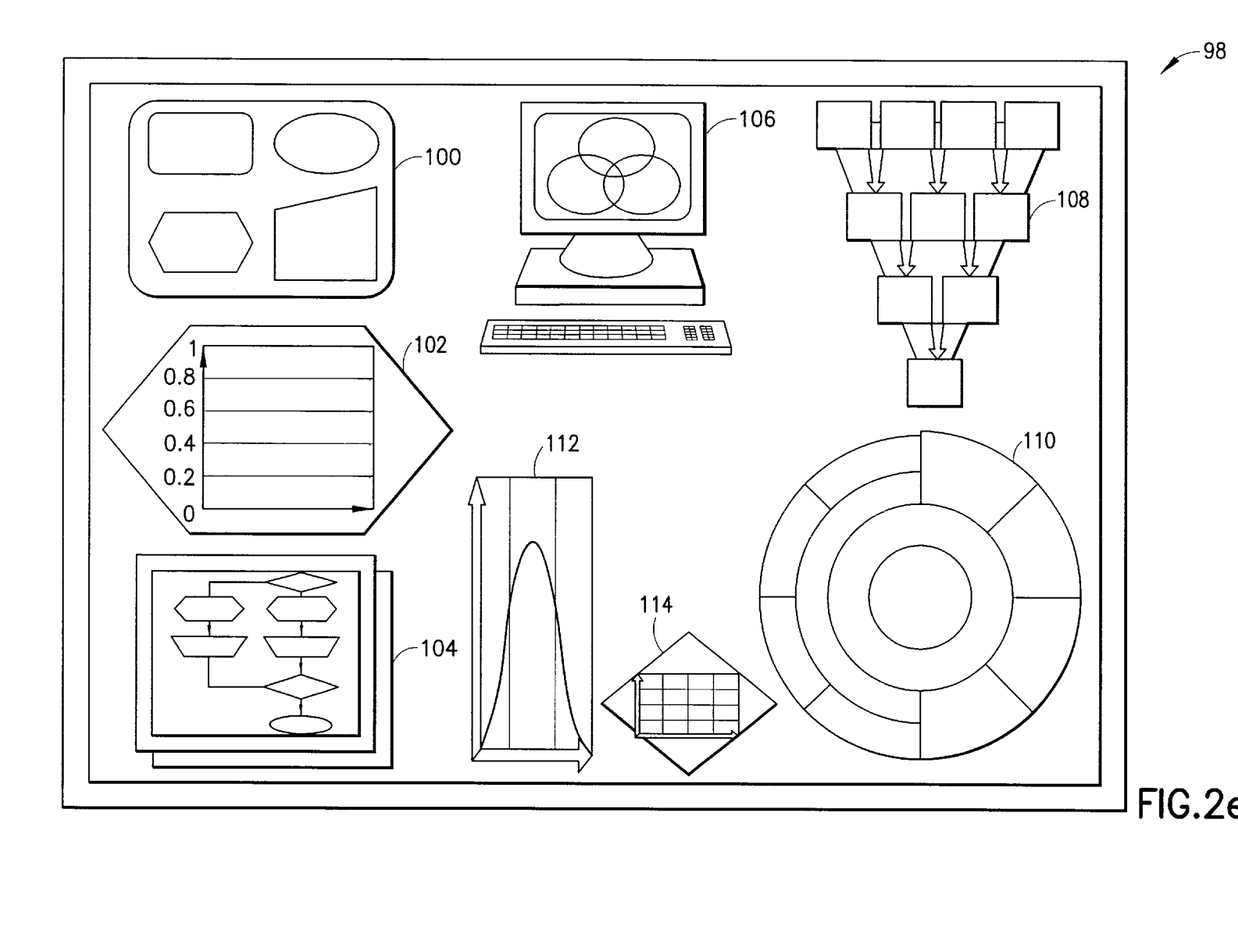

FIG. 2e, finally, shows a computer modified screen layout that can be presented to the user upon instantiation of a second operating session, and in accordance with the present invention. Note, firstly, the fact that FIG. 2e is qualitatively distinct from the default FIG. 1 screen, since it reflects and is responsive to changes manifest by the user over the first operating session (i.e., FIGS. 2a–d). Thus, for example, FIG. 2e includes the FIG. 2a circular icon (absent from the Fig. default screen); and, shows the preferred (FIGS. 2b, c, d) topology of left/right column icons (namely, to the left). Further, the FIG. 2e screen layout may be differentiated from the last user screen (FIG. 2d), since FIG. 2e shows a statistically preferred Gaussian curve—Cartesian grid topology (developed in FIGS. 2b, c) that outweighs the last user preference (FIG. 2d); so that FIG. 2e (like FIGS. 2b and c), and unlike FIG. 2d, shows the Gaussian curve—Cartisian grid located side by side (and not top to bottom).

Figure 3:
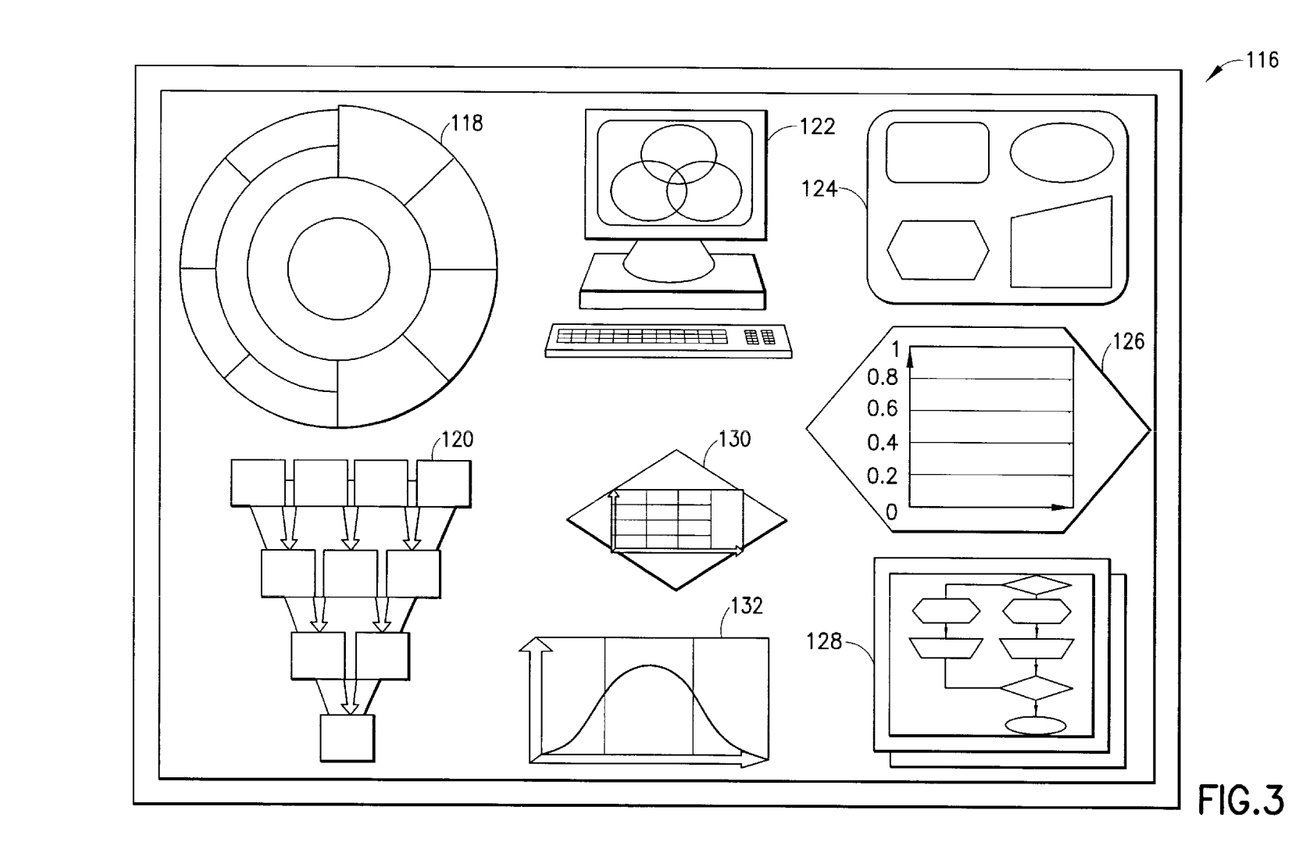
FIG. 3 shows a computer generated instant window for display during a second operating session, which instant window has been adaptively modified from a FIG. 1 default condition window so that its properties correlate to the user's specific window activity pattern developed over the first operating session, and as further enhanced by the computer.

FIG. 3, numerals 116–132, shows an additional invention capability. Here, the FIG. 2e computer generated screen, responsive solely to user input, may be additionally enhanced to capture optimization correlations or constraint imposition, beyond the immediate user inputs.

When a new session is instantiated, the invention presents to the user its best estimate of the window pattern expected by the user, as shown in FIG. 2e, numeral 98. This may be based on analysis of that particular user's windows activities, spanning not only a previous session, but several other preceding sessions as well (sequential, or statistically sampled).

Figure 4:
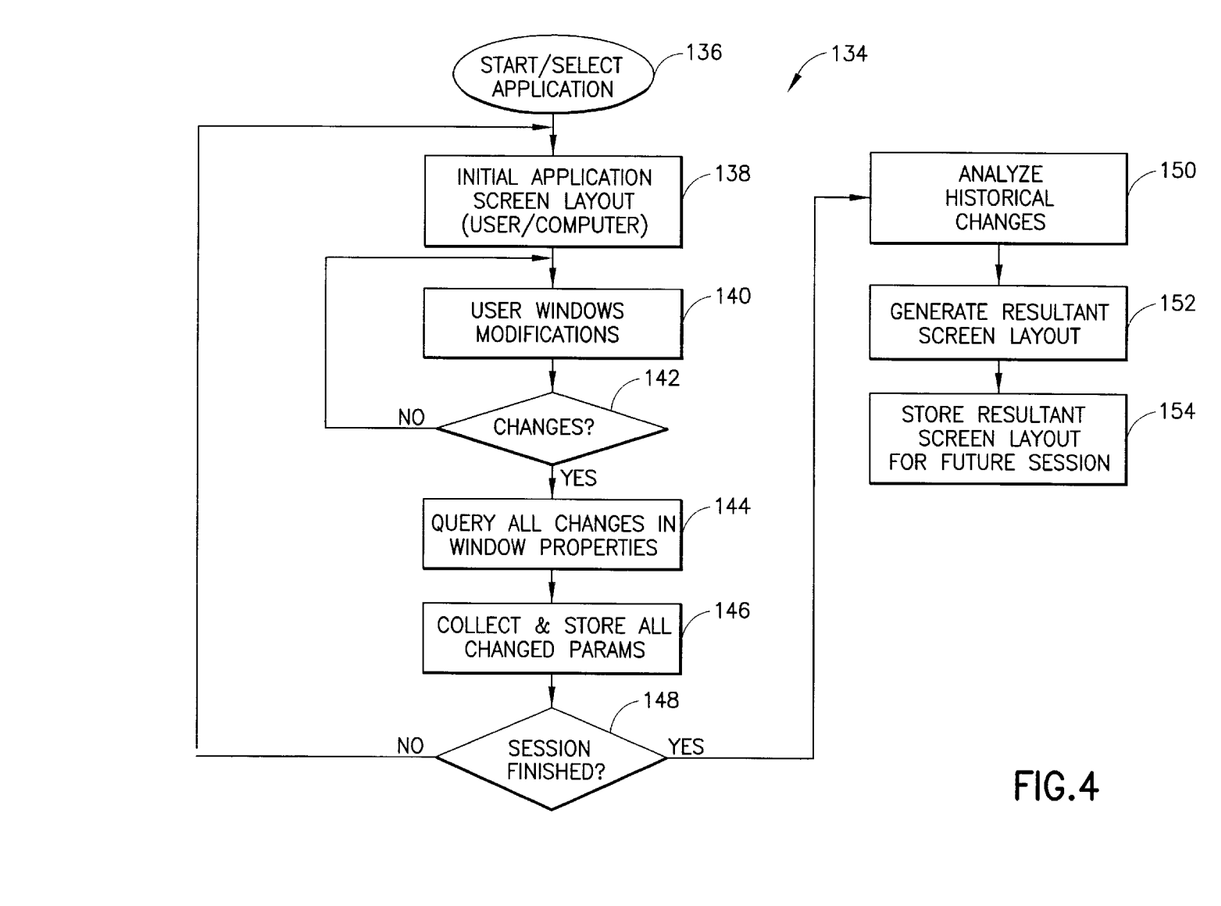
FIG. 4 shows an operational flowchart for one way of realizing the present invention.

Typical operation can proceed as follows, and reference is usefully made to the FIG. 4 flow chart (numerals 134–154).

1. User starts a new session. A default screen comes up and displays current system estimate of the windows pattern desired by the user. This may be ordered in frequency-of-use decreasing order.
2. User modifies the window pattern according to his/her current desires. The invention keeps track of user activities.
3. User selects and modifies the content of one or more windows. The invention monitors user activity in window content.
4. When done, the user can press a Save button, to save the screen and start a new application, or simply switch to a new application, in which case the invention will be responsible for analysis and presentation of the preferred windows pattern when a new session for this application is initiated.

Instead of generating new patterns, the user can recall stored patterns and execute them, or set up to automatically recall and execute stored queries (e.g., for daily or weekly activities). This may be performed via a menu system.

Note that all these capabilities exist within a minimum number of screens, in a very easy-to-use and intuitive fashion. The user need not know or have to wade through several layers of windows and dialog boxes to achieve his or her goals.

As an integral, important capability, the display format may be automatically changed by the computer (FIG. 3). The computer keeps a frequency-of-use file for each action specified by the user and its associated displays. This usage frequency preferably is maintained over several sessions, thereby constructing a moving average of usage frequency and therefore determining the actions' measure of importance.

All actions/items with a measure greater than a user selected threshold may be selected automatically for primary display, and may be displayed on a minimum number of screens on a cell by cell basis, according to their priorities.

For example, FIG. 2e, as discussed, is the result of user modifications of the FIG. 1 initial screen layout presented to the user for this application at the start of this session. Therefore, the lower rated displays are relegated to secondary screens. The computer automatically superimposes a grid on its screen, thereby partitioning the screen into display cells. A placement of these selected displays, on the basis of usage frequency, is generated, resulting in optimal layout for each user's specific activity pattern. A resulting modification/enhancement of the displayed screen, following computer analysis, is shown in FIG. 3. The improvement may be discerned.

Figure 5A:
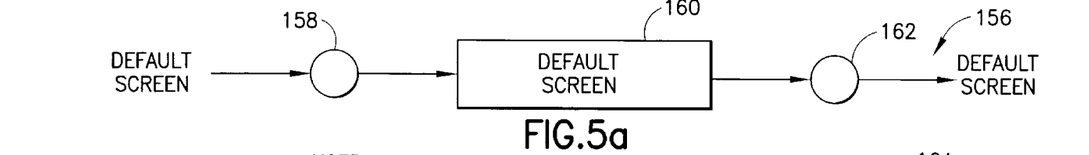
Figure 5B:
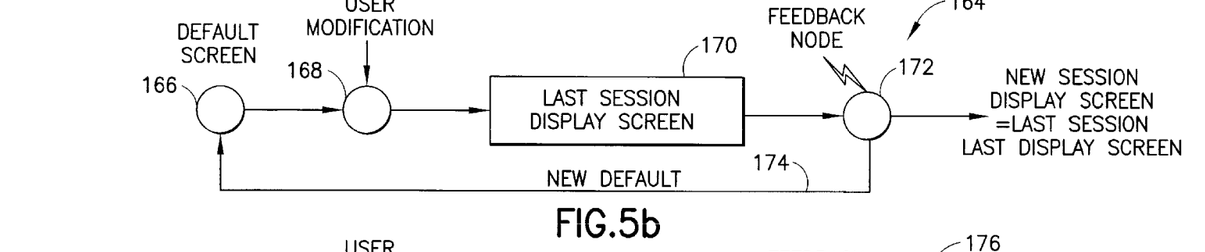
Figure 5C:
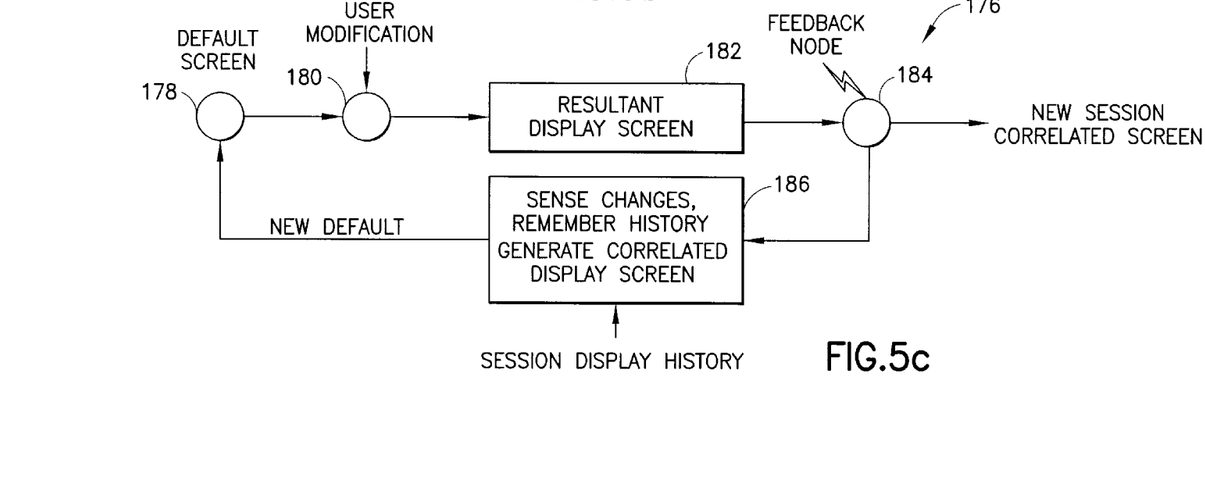
FIG. 5c shows a feedback control system that heuristically represents one way of conceptualizing the present invention.

FIG. 5c shows a feedback control circuit that heuristically represents one way of conceptualizing the present invention, and is usefully contrasted to the FIGS. 5a, b prior art heuristic control circuits.

It is to be understood that the present invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine is capable of implementing the flow chart shown in FIG. 4, can be used as a controller with the invention.

What is claimed:

1. A computer operated method comprising:
    ascertaining a window property to be displayed on a computer screen in a default condition during a first operating session;
    monitoring window property changes prompted by user inputs to effect changes from the default condition of the window, thereby reflecting a user's specific window activity pattern developed over a plurality of operating sessions;
    creating a referent comprising a history of the window activity pattern;
    statistically sampling user window activity over said plurality of operating sessions; and
    using the referent for generating an instant window which has been adaptively modified from the default condition window,
    wherein an adapted display window is based on statistically sampled user window activity over said plurality of operating sessions.

2. The method according to claim 1, wherein said ascertaining a window property comprises ascertaining a status of the default condition by registering at least one of font, color, location, shape and content of the default window.

3. The method according to claim 1, wherein said window property changes comprise changes prompted by the user throughout said plurality of operating sessions.

4. A program storage device readable by machine, and tangibly embodying a program of instructions executable by the machine to perform method steps for providing an adaptive window display, the method comprising:
    ascertaining a window property to be displayed on a computer screen in a default condition during a first operating session;
    monitoring window property changes prompted by user inputs to effect changes from the default condition of the window to reflect a user's specific window activity pattern developed over a plurality of operating sessions;
    creating a referent comprising a history of the window activity pattern;
    statistically sampling user window activity over said plurality of operating sessions; and
    using the referent for generating an instant window which has been adaptively modified from the default condition window,
    wherein an adapted display window is based on statistically sampled user window activity over said plurality of operating sessions.

5. A computer system suitable for providing an adaptive computer screen window display, the system comprising:
    CPU means for ascertaining a window property to be displayed on a computer screen in a default condition during a first operating session;
    CPU means for monitoring window property changes prompted by user inputs to effect changes from the default condition of the window to reflect a user's specific window activity pattern developed over a plurality of operating sessions;

CPU means for creating a referent comprising a history of the window activity pattern;

statistically sampling user window activity over said plurality of operating sessions; and CPU means for using the referent for generating an instant window which has been adaptively modified from the default condition window, wherein an adapted display window is based on statistically sampled user window activity over said plurality of operating sessions.

6. A computer system comprising:

an open loop structure comprising:
- a default screen node;
- a summing node;
- a first input vector derived from the default screen node for input to the summing node and comprising a computer display default screen from a preceding operating session;
- a second input vector to the summing node comprising a user generated display screen for input to the summing node during a current operating session, the summing node capable of receiving said first and second input vectors and outputting a first signal; and
- a display processing module which receives the first signal and outputs a resultant display screen; and a closed loop structure comprising a feedback loop which closes around the open loop structure by:
- sensing changes in a current display;
- remembering a history of resultant changes developed over a plurality of operating sessions;
- statistically sampling user changes over said plurality of operating sessions; and
- generating a display screen which is correlated to the history of changes for outputting to the default screen node a new default screen for presentation upon instantiation of a subsequent operating session, wherein said new default screen is based on statistically sampled user changes over said plurality of operating sessions.

7. A method for adapting a computer display screen to a user preference, comprising:

detecting user changes to at least one property of said display screen during an operating session;

storing said user changes in memory over a plurality of operating sessions;

statistically sampling user changes over said plurality of operating sessions;

altering said display screen, based upon said user changes, to generate an adapted display screen during a subsequent operating session, wherein said adapted display screen is based on statistically sampled user changes over said plurality of operating sessions.

8. The method according to claim 7, wherein said window property comprises a window layout of said display screen.

9. The method according to claim 7, wherein said detecting is performed at predetermined time intervals.

10. The method according to claim 7, wherein said window property comprises the size of an image on said display screen.

11. The method according to claim 7, wherein said window property comprises the location of an image on said display screen.

12. The method according to claim 7, wherein said adapted display screen comprises a user preferred display screen.

13. The method according to claim 7, wherein only said user changes having a measure greater than a user-selected threshold are used to alter said display screen.

14. The method according to claim 7, wherein said altering said display screen comprises automatically altering said display screen.

* * * * *